(12) United States Patent

Malladi et al.

(10) Patent No.: US 7,474,643 B2
(45) Date of Patent: *Jan. 6, 2009

(54) SYSTEMS AND METHODS FOR COMMUNICATING CONTROL DATA USING MULTIPLE SLOT FORMATS

(75) Inventors: Durga Prasad Malladi, San Diego, CA (US); Serge D. Willenegger, Onnens (CH); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 543 days.

This patent is subject to a terminal disclaimer.

(21) Appl. No.: 10/952,426

(22) Filed: Sep. 27, 2004

(65) Prior Publication Data

US 2005/0163075 A1   Jul. 28, 2005

Related U.S. Application Data

(60) Provisional application No. 60/508,584, filed on Oct. 2, 2003.

(51) Int. Cl.
*H04Q 7/00* (2006.01)
*H04Q 7/28* (2006.01)
*H04J 3/00* (2006.01)
*H04J 3/12* (2006.01)
*H04B 7/212* (2006.01)

(52) U.S. Cl. .................. 370/329; 370/336; 370/337; 370/341; 370/345; 370/442; 370/498; 370/524

(58) Field of Classification Search .......... 370/320–321, 370/280, 294, 310, 485, 487, 522, 908, 901–902, 370/912–913, 915, 229–231, 235, 264–265, 370/318, 326, 328–330, 335–338, 340–350, 370/431–432, 436–437, 441–443, 462, 464–465, 370/468–474, 476–480, 491, 493–498, 500, 370/508, 512–514, 524, 529, 536–554; 455/41.2, 455/422.1, 450–451, 509, 550.1, 556.2, 560–561, 455/13.4, 68–70, 418–420, 434, 452.1–452.2, 455/455, 464, 466, 511, 515–517, 522
See application file for complete search history.

(56) References Cited

U.S. PATENT DOCUMENTS

| | | | |
|---|---|---|---|
| 5,440,542 A | 8/1995 | Procter et al. | |
| 5,859,840 A | 1/1999 | Tiedemann, Jr. et al. | |
| 5,991,285 A * | 11/1999 | Ghosh | 370/335 |
| 6,266,321 B1 | 7/2001 | Pehkonen et al. | |
| 6,341,125 B1 * | 1/2002 | Hong et al. | 370/335 |
| 6,522,638 B1 | 2/2003 | Haugli et al. | |
| 6,707,859 B1 | 3/2004 | Kinnunen et al. | |
| 6,747,963 B1 * | 6/2004 | Park et al. | 370/335 |
| 6,813,323 B2 | 11/2004 | Kajita et al. | |
| 6,813,506 B1 * | 11/2004 | Song | 455/466 |
| 6,816,507 B1 | 11/2004 | Jarbot et al. | |
| 6,868,075 B1 * | 3/2005 | Narvinger et al. | 370/335 |
| 6,985,471 B1 | 1/2006 | Holma et al. | |
| 6,987,778 B2 | 1/2006 | Sindhushayana et al. | |
| 7,054,381 B2 * | 5/2006 | Lim et al. | 375/295 |
| 7,088,697 B1 | 8/2006 | Benz et al. | |
| 7,088,700 B2 | 8/2006 | Lee et al. | |
| 7,120,134 B2 | 10/2006 | Tiedemann, Jr. et al. | |
| 7,177,345 B2 | 2/2007 | Kim | |
| 7,180,874 B2 * | 2/2007 | Ma et al. | 370/328 |
| 7,200,126 B2 * | 4/2007 | Lim | 370/331 |
| 7,324,565 B2 | 1/2008 | Malkamaki | |
| 2002/0141436 A1 * | 10/2002 | Toskala | 370/442 |
| 2003/0072290 A1 * | 4/2003 | Hwang et al. | 370/342 |
| 2003/0103473 A1 * | 6/2003 | Warich et al. | 370/318 |

| | | | |
|---|---|---|---|
| 2003/0210712 A1* | 11/2003 | Cai et al. | 370/498 |
| 2004/0100918 A1* | 5/2004 | Toskala et al. | 370/314 |

FOREIGN PATENT DOCUMENTS

| | | |
|---|---|---|
| EP | 1248485 | 9/2002 |
| WO | 00005829 | 2/2000 |
| WO | 03015310 | 2/2003 |

OTHER PUBLICATIONS

"Universal Mobile Telecommunications System (UMTS); Physical Channels and Mapping of Transport Channels onto Physical Channels (FDD)", ETSI TS 125 211 V3.1.1., Nov. 2, 2002, pp. 1-38; XP002151815.

Dahlman E., et al., "WCDMA-The Radio Interface for Future Mobile Multimedia Communications", IEEE Transactions on Vehicular Technology, Nov. 1998 pp. 1105-1118.

"Universal Mobile Telecommunications System (UMTS); Physical Channels and Mapping of transport Channels onto Physical Channels (FDD)", ETSI, (3G TS 25.211 V3.1.1. Release 1999, pp. 1-38.

International Search Report-PCT/US04/032395, International Search Authority European Patent Office Jan. 26, 2005.

* cited by examiner

*Primary Examiner*—Meless N Zewdu

(74) *Attorney, Agent, or Firm*—Roberta A. Young; Kenyon S. Jenckes; Thomas R. Rouse

(57) ABSTRACT

Systems and methods for communicating control information in slots that use at least two different slot formats. In one embodiment, a method implemented in a wireless communication system includes providing at least two different slot formats, formatting control data in the slots of a control frame according to the at least two different slot formats, transmitting the control frame from a mobile station to a base station via a control channel, receiving the control frame, extracting data rate information from the control frame according to the at least two different slot formats, decoding the extracted control data, parsing the extracted data into separate data rate information and decoding data received via one or more data channels using the decoded control data. In one embodiment, the method is used to enable additional TFCI data corresponding to two different data channels to be transmitted on a single control channel.

49 Claims, 8 Drawing Sheets

SYSTEMS AND METHODS FOR COMMUNICATING CONTROL DATA USING MULTIPLE SLOT FORMATS

CLAIM OF PRIORITY UNDER 35 U.S.C. §119

The present application for patent claims priority to Provisional Application No. 60/508,584 entitled "Control Channel that Minimizes Impact on Legacy Channels" filed Oct. 2, 2003, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"Systems and Method for Multiplexing Control Data for Multiple Data Channels Onto a Single Control Channel", co-pending Application No.10/952.265, filed concurrently herewith, assigned to the assignee hereof, and expressly incorporated by reference herein; and "Systems and Method for Multiplexing Control Information onto a Physical Data Channel" co-pending Application No. 10/952.266, filed concurrently herewith, assigned to the assignee hereof, and expressly incorporated by reference herein.

FIELD

The present invention relates generally to communication systems and more particularly to systems and methods for providing systems and methods for communicating control information by transmitting the control information in slots that use at least two different slot formats.

BACKGROUND

A wireless telecommunications system may be used to enable information to be communicated between a mobile device and a base station, between a mobile device and an information server, between mobile devices, and so on. The information communicated between the various devices may include audio (e.g., voice) information, high speed data, control information and various other types of data.

One exemplary telecommunications system includes a base station controller, one or more base stations and one or more mobile stations. Each of the base stations is coupled to the base station controller by a network that is normally referred to as the backhaul network. The backhaul network typically comprises physical communication links between the base station controller and the base stations. Each of the mobile stations is coupled to one of the base stations. The communication links between the mobile stations and the base stations comprise wireless links.

The wireless communication link between each mobile station and the base station with which it communicates includes a set of channels for communicating data from the base station to the mobile station, as well as a set of channels for communicating data from the mobile station to the base station. The first set of channels (from base station to mobile station) are referred to as the forward link. The second set of channels (from mobile station to base station) are referred to as the reverse link.

The channels of both the forward link and reverse link are configured to carry various types of information. For example, some of the channels carry data, while others carry control information. In one embodiment, the reverse link includes a primary dedicated data channel and a corresponding dedicated control channel. The control channel is configured to carry information necessary to decode the primary dedicated data channel, such as an indication of the data rate at which data is transmitted on the data channel.

It may be desirable to add another data channel to this system. Just as with the primary dedicated data channel, it will be necessary to transmit control information for the additional data channel in order to enable the base station to decode the data that is transmitted on the additional data channel. Conventionally this control information would be transmitted on an additional control channel corresponding to the additional data channel. This solution, however, is disadvantageous in that it requires the use of resources (e.g., additional processing, additional spreading codes, etc.) to support the additional control channel. It would therefore be desirable to provide improved systems and methods for communicating the necessary control information for the additional data channel.

SUMMARY

Embodiments disclosed herein address the above stated needs by providing systems and methods for communicating control information by transmitting the control information in slots that use at least two different slot formats. One embodiment comprises a method implemented in a wireless communication system including providing at least two different slot formats, formatting control data in the slots of a control frame according to the at least two different slot formats, transmitting the control frame from a mobile station to a base station via a control channel, receiving the control frame, extracting the control data from the control frame according to the at least two different slot formats, decoding the extracted control data, and decoding data received via one or more data channels using the decoded control data. In one embodiment, the method is used to enable additional TFCI data corresponding to two different data channels to be transmitted on a single control channel.

An alternative embodiment comprises a method implemented in a mobile station of a wireless communication system, including providing at least two different slot formats, formatting control data for a plurality of slots in a control frame according to the at least two different slot formats, and transmitting the control data for the plurality of slots in the control frame in the at least two different slot formats.

Another alternative embodiment comprises a method implemented in a base station of a wireless communication system, including receiving frames of control information via a control channel, extracting control data from the frames of control information according to at least two different slot formats, decoding the extracted control data, and decoding data received via one or more data channels using the decoded control data.

Another alternative embodiment comprises a wireless communication system including a mobile station and a base station. The mobile station is configured to provide at least two different slot formats, format control data for a plurality of slots in a control frame according to the at least two different slot formats, and transmit the control data for the plurality of slots in the control frame in the at least two different slot formats. The base station is configured to receive the control frame via a control channel, extract control data from the control frame according to the at least two different slot formats, decode the extracted control data, and decode data received via one or more data channels using the decoded control data.

Another alternative embodiment comprises a mobile station for a wireless communication system including a transceiver subsystem and a processing subsystem. The processing subsystem is configured to provide at least two different slot formats, format control data for a plurality of slots in a control frame according to the at least two different slot formats, and wherein the transceiver subsystem is configured to transmit the control data for the plurality of slots in the control frame in the at least two different slot formats.

Another alternative embodiment comprises a base station for a wireless communication system, including a transceiver subsystem and a processing subsystem. The transceiver subsystem is configured to receive frames of control information via a control channel. The processing subsystem is configured to extract control data from the frames of control information according to at least two different slot formats, decode the extracted control data, and decode data received via one or more data channels using the decoded control data.

Numerous additional alternative embodiments are also possible.

BRIEF DESCRIPTION OF THE DRAWINGS

Various aspects and features of the invention are disclosed by the following detailed description and the references to the accompanying drawings, wherein.

Figure 1:
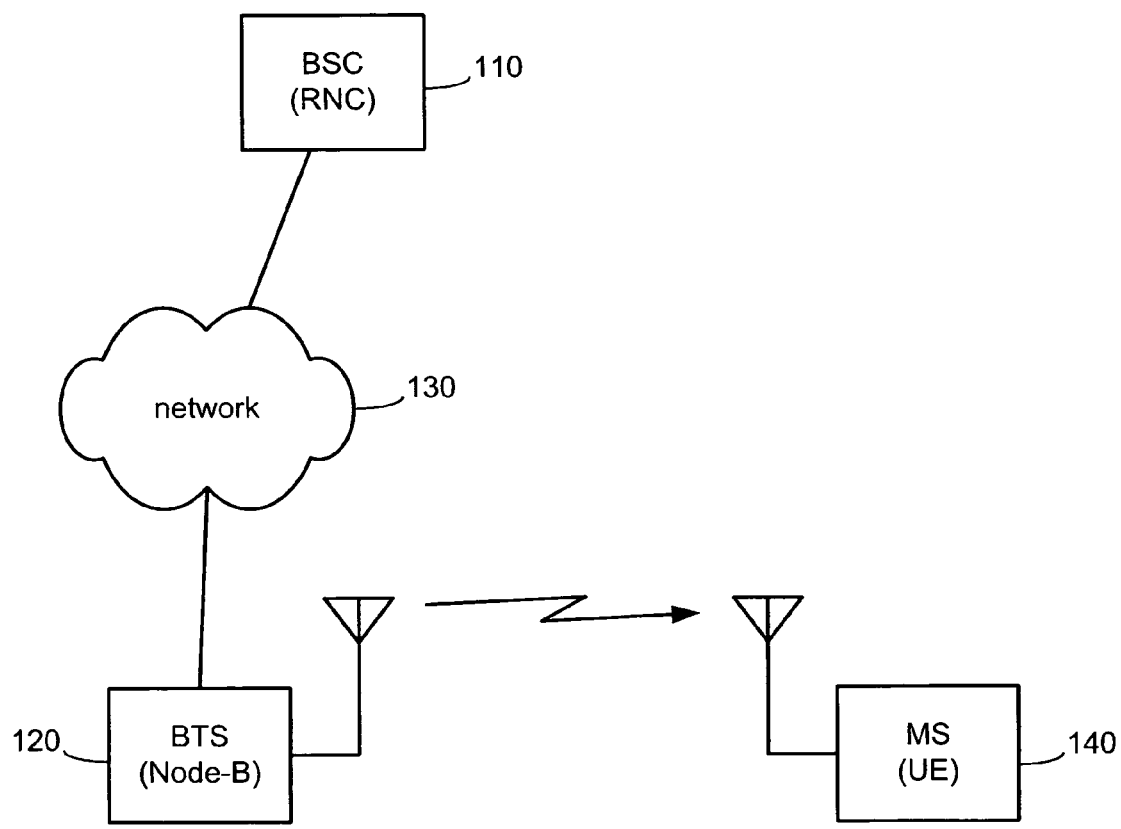
FIG. 1 is a diagram illustrating the high-level structure of a wireless telecommunications system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described.

DETAILED DESCRIPTION

One or more embodiments of the invention are described below. It should be noted that these and any other embodiments described below are exemplary and are intended to be illustrative of the invention rather than limiting.

As described herein, various embodiments of the invention comprise systems and methods for communicating control information by transmitting the control information in slots that use at least two different slot formats. In one embodiment, a method is implemented in a wireless communication system. The method includes providing at least two different slot formats, formatting control data in the slots of a control frame according to the at least two different slot formats, transmitting the control frame from a mobile station to a base station via a control channel, receiving the control frame, extracting the control data from the control frame according to the at least two different slot formats, decoding the extracted control data, and decoding data received via one or more data channels using the decoded control data. In one embodiment, the method is used to enable additional TFCI data corresponding to two different data channels to be transmitted on a single control channel.

One embodiment of the invention is implemented in a wireless telecommunications system that is designed in accordance with a WCDMA (wideband code division multiple access) standard. It will therefore be helpful to describe the basic structure and operation of such a system in order to aid in the understanding of the invention. It should be noted that, while the following description focuses primarily upon a system that follows this standard, alternative embodiments may be implemented in systems that follow other standards as well.

Referring to FIG. 1, a diagram illustrating the structure of a wireless telecommunications system in accordance with one embodiment is shown. System 100 includes a base station controller 110, a base station 120 that is coupled to base station controller 110 through a backhaul network 130, and a mobile station 140. System 100 may include additional base stations and mobile stations which, for purposes of clarity, are not shown in the figure.

The terminology used to refer to the components of the system may differ from one embodiment to another. For example, base station controller 110 may be referred to as a radio network controller (RNC), base station 120 may be referred to as a "Node-B," and mobile station 140 may be referred to as user equipment (UE). Because the various embodiments of the invention may be implemented in different types of wireless communication systems (e.g., systems designed according to different standards or different releases of the same standard,) references to the different components of the systems should be interpreted broadly, and references to particular components using terminology applicable to a particular type of system should not be construed to imply that the embodiments of the invention are limited to that particular type of system.

It should also be noted that, while the description herein of this and other embodiments focuses on a system in which a mobile station may move with respect to a base station, other embodiments may be implemented in systems that enable wireless communication between alternative types of devices. It is not necessary that one of the devices be a "base station," nor is it necessary that the other of the devices be "mobile." References herein to mobile stations and base stations should therefore be construed to include any wireless transceiver devices that are in communication with each other.

While, in practice, the specific designs of base station 120 and mobile station 140 may vary significantly, each serves as a wireless transceiver for communicating over the forward and reverse links. Base station 120 and mobile station 140 therefore have the same general structure. This structure is illustrated in FIG. 2.

Figure 2:
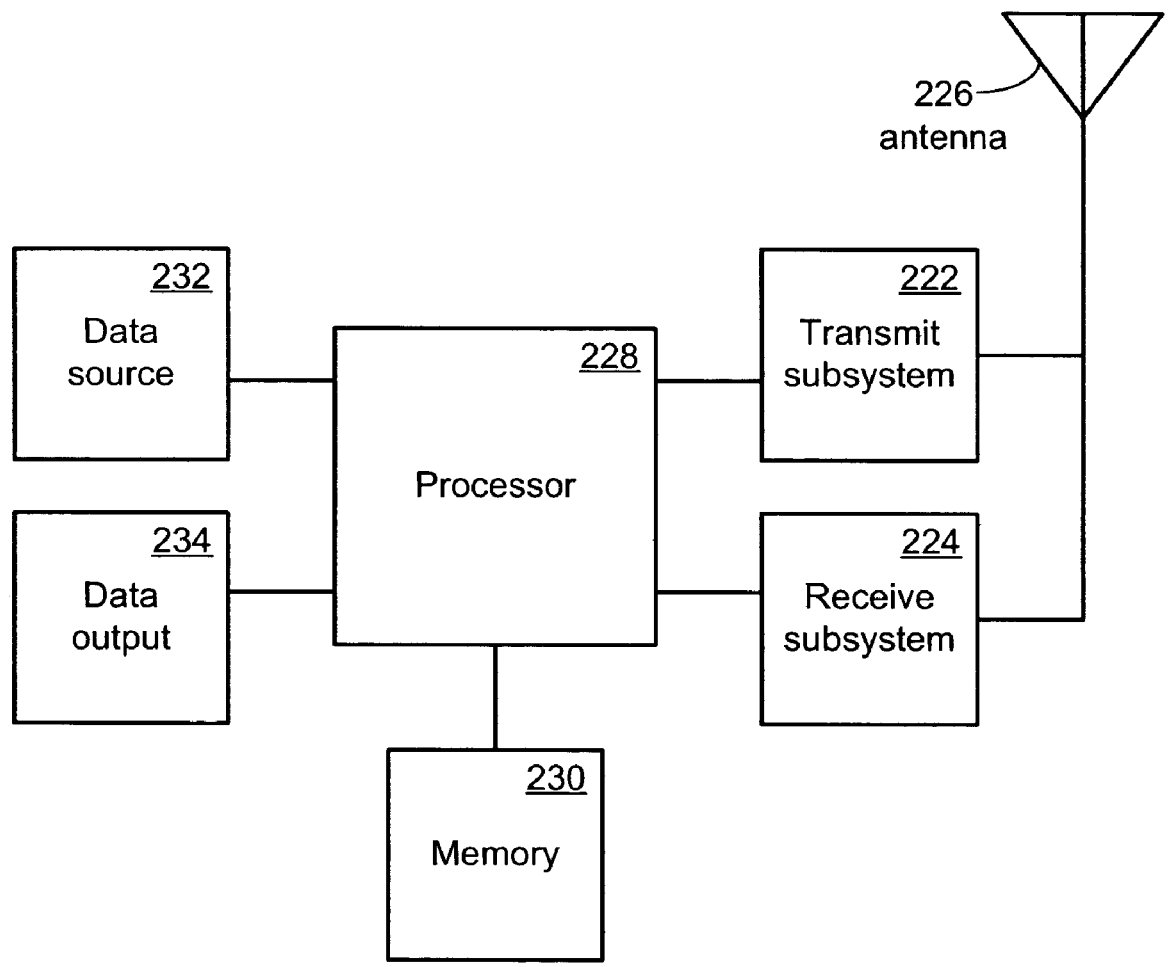
FIG. 2 is a functional block diagram illustrating the basic structural components of a wireless transceiver system in accordance with one embodiment.

Referring to FIG. 2, a functional block diagram illustrating the basic structural components of a wireless transceiver system in accordance with one embodiment is shown. As depicted in this figure, the system comprises a transmit subsystem 222 and a receive subsystem 224, each of which is coupled to an antenna 226. Transmit subsystem 222 and receive subsystem 224 may be collectively referred to as a transceiver subsystem. Transmit subsystem 222 and receive subsystem 224 access the forward and/or reverse link through antenna 226.

Transmit subsystem 222 and receive subsystem 224 are also coupled to processor 228, which is configured to control transmit and receive subsystems 222 and 224. Memory 230 is coupled to processor 228 to provide working space and local storage for the processor. Processor 228 and memory 230 may be collectively referred to as a processing subsystem. A data source 232 is coupled to processor 228 to provide data for transmission by the system. Data source 232 may, for example, comprise a microphone or an input from a network device. The data is processed by processor 228 and then forwarded to transmit subsystem 222, which transmits the data via antenna 226. Data received by receive subsystem 224 through antenna 226 is forwarded to processor 228 for processing and then to data output 234 for presentation to a user. Data output 234 may comprise such devices as a speaker, a visual display, or an output to a network device.

Persons of skill in the art of the invention will appreciate that the structure depicted in FIG. 2 is illustrative and that other embodiments may use alternative configurations. For example, processor 228, which may be a general-purpose microprocessor, a digital signal processor (DSP) or a special-purpose processor, may perform some or all of the functions of other components of the transceiver, or any other processing required by the transceiver. The scope of the claims set forth below are therefore not limited to the particular configurations described herein.

Mobile station 140 typically is not stationary (although, in some instances, it may be.) Mobile station 140 is instead likely to move with respect to base station 120. The changing position of mobile station 140 typically causes the channel conditions for the wireless link between mobile station 140 and base station 120 to vary. The channel conditions may also be affected by other factors, such as atmospheric conditions, movement of other objects between mobile station 140 and base station 120, interference from other transmitters, and so on.

Because of the changes in the channel conditions for the wireless communication link, there may be changes in the data rate at which mobile station 140 transmits data to base station 120. These changes in the data rates used by mobile station 140 to transmit the data are necessary to provide a high enough signal-to-noise ratio, SNR, (or signal-to-interference-and-noise ratio, SINR,) that base station 120 will receive the data with an acceptable error rate. The better the channel conditions, the higher the data rate that can be used by the mobile station. The worse the channel conditions, the lower the data rate that must be used by the mobile station.

The data rate and corresponding data format for one or more channels may, in some embodiments, be referred to as a transport format (TF) or transport format combination (TFC). For purposes of clarity, individual transport formats as well as transport format combinations may be referred to below simply as data rates.

In one embodiment, the mobile station of the wireless telecommunications system is configured to transmit information to the base station on three channels. The first of these channels is a dedicated data channel. This data channel may carry various types of data, including such high priority data as voice data, streaming video or the like, and lower priority data, the delivery of which is not delay-sensitive. This dedicated data channel may be referred to herein as the primary data channel. The second of the channels is a control channel. The control channel carries control information that is needed by the base station in order to properly decode the data transmitted on the primary data channel. This control information may, for example, include pilot channel information, power control information and data rate information. These different types of information may also be characterized as different logical channels within the physical control channel.

The primary data channel and the control channel are found in conventional WCDMA systems. Typically, for each frame that is transmitted on the primary data channel, there is a corresponding frame that is transmitted on the control channel. The information contained in the frame of the control channel is received by the base station, decoded, and then used to decode the information in the data channel frame. The control channel frame may be transmitted synchronously with the corresponding data channel frame, or it may be transmitted prior to transmission of the corresponding data channel frame.

In the present embodiment, in addition to the primary data channel and the control channel, a third channel (an enhanced dedicated data channel) is transmitted from the mobile station to the base station. The enhanced data channel is used in this embodiment to transmit data for high-speed, non-delay-sensitive services. In alternative embodiments, other types of data may be transmitted. While it is necessary to transmit control information for the enhanced data channel to the base station so that the base station can decode the data received via the enhanced data channel, this control information is not transmitted in a control channel that is separate from the control channel described above. Instead, the control information for the enhanced data channel is combined with the control information for the primary data channel, and the combined control information is transmitted from the mobile station to the base station on the one control channel. The manner in which this is accomplished is described in detail below.

Figure 3:
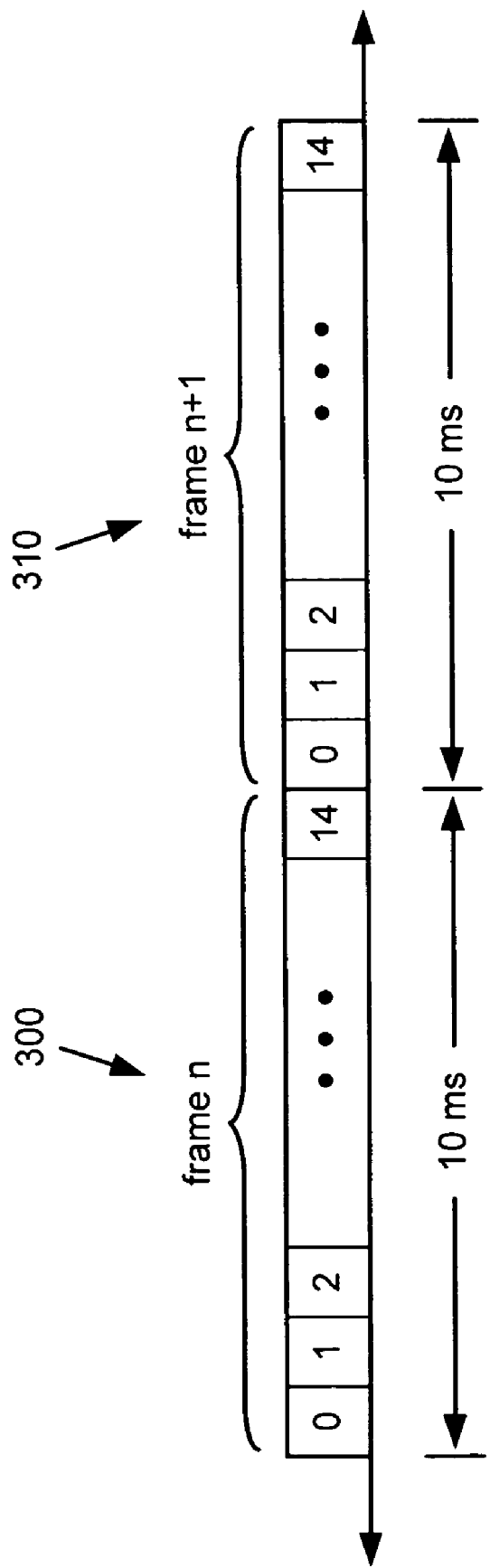
FIG. 3 is a diagram illustrating the structure of frames of data transmitted on a pair of data channels and a control channel in accordance with one embodiment.

In the present embodiment, all three of the channels (the primary dedicated data channel, the dedicated control channel and the enhanced dedicated data channel) use the same frame format. This format is illustrated in FIG. 3. FIG. 3 shows two frames, 300 and 310. As shown in this figure, each frame spans ten milliseconds. Each frame is further broken down into 15 slots, such as, slot 0 to slot 14 illustrated in FIG 3.

Figure 4:
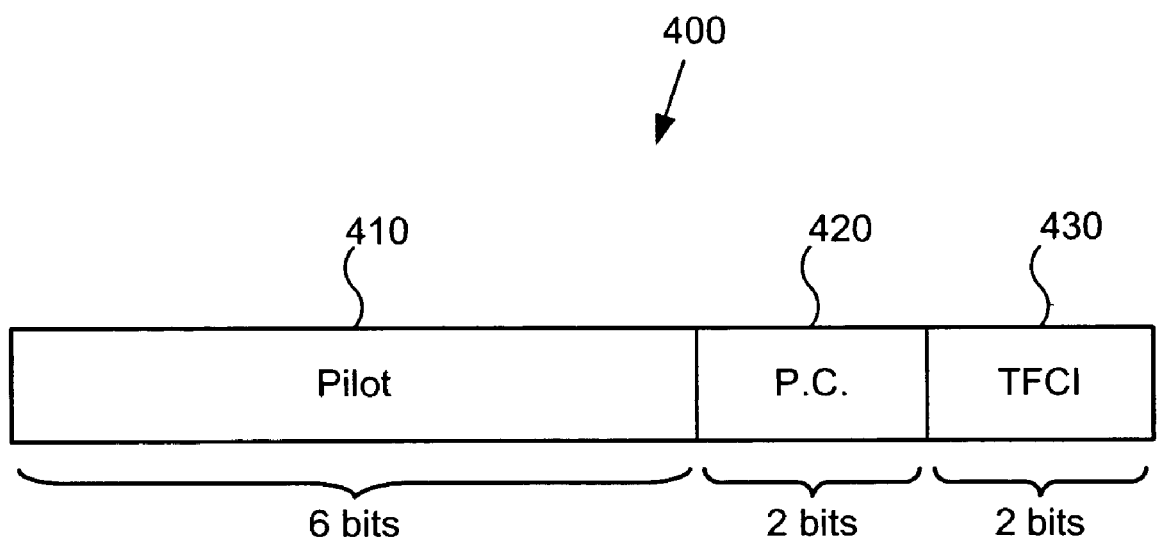
FIG. 4 is a diagram illustrating the structure of the control information within each slot of a control frame in accordance with one embodiment.

As mentioned above, the control channel is used in this embodiment to transmit control information including pilot data, power control data and data rate information. Referring to FIG. 4, a diagram illustrating the structure of this information within each slot is shown. FIG. 4 depicts a single slot 400. Contained within slot 400 is pilot data 410, power control data 420 and data rate information 430. Slot 400 consists of ten data bits. Six of these ten bits are used to convey pilot data 410, while two bits are used as power control data 420 and two bits are used for data rate information 430. The data rate information is shown in the figure as the TFCI, or transport format combination indicator. The allocation of the bits of the slot as shown in FIG. 4 is referred to as the slot format. The same slot format is conventionally used for every slot.

While TFCI information 430 comprises only two bits of the slot format, 30 bits are available to communicate the TFCI value for each frame because the selected transport formats used by the mobile station to transmit data on the primary and enhanced data channels are updated on a frame by frame basis. In other words, while each data channel can select a different transport format for each succeeding frame, the transport format remains unchanged during the frame. Thus, all of the 30 TFCI bits in the frame (two bits times fifteen slots,) rather than only the two TFCI bits in a single slot, are available to communicate the selected TFCI value.

It should be noted that the 30 bits of TFCI information transmitted in a frame are encoded data, rather than raw TFCI data. Because the encoding process used in a wireless communication system such as the system of the present embodiment typically increases the number of bits of data, less than 30 bits of raw transport format information are communicated. The encoding (and the corresponding increased number of bits) is intended to increase the reliability with which the data is communicated.

Figure 5:
FIG. 5 is a flow diagram illustrating the process through which data rate information is encoded in accordance with one embodiment.

Referring to FIG. 5, a flow diagram illustrating the process through which data rate information is encoded in accordance with one embodiment is shown. In this figure, data rate information (TFCI) is encoded (block 510.) In this case, the encoder implements a ⅓ encoding scheme. The encoding consists of covering the original data rate information with spreading codes in a manner which is well known to persons of skill in the field of WCDMA communications. The encoding of the original data rate information, which consists of ten data bits, results in 32 bits of encoded rate information data. Because the slot format for the control channel, as described above in connection with FIG. 4, makes available only 30 bits for data rate information, some form of rate matching must be performed (block 520.) In one embodiment, the rate matching function may simply consist of "puncturing" the encoded data, or dropping the last two bits.

Thus, 30 bits of encoded data rate information are generated from the ten bits of the original data rate information. The 30 bits of encoded data rate information can then be transmitted from the mobile station to the base station by transmitting the first two bits in the first slot of the frame, the next two bits in the second slot of the frame, and so on, until all 30 bits have been transmitted.

In a conventional system, all ten bits of the original data rate information are available for use in conveying the data rate used by the primary dedicated data channel. Typically, however, ten bits are not required to identify the data rate for the primary data channel. It is normally the case that there are a relatively small number of possible data rates for this data channel. For instance, there may only be four, eight, or 16 possible data rates from which the actual data rate may be selected. If there are only four possible data rates, only two bits are necessary to identify which of the four ($2^2$) possible data rates has been selected. Similarly, if there are only eight ($2^3$) or 16 ($2^4$) possible data rates, only three or four bits, respectively, are necessary to identify the selected rate. Consequently, in these examples, six to eight bits of the ten bits that are available to convey data rate information are unused.

In the present embodiment, the bits that are not used to identify the data rate for the primary data channel are instead used to identify the data rate of the enhanced data channel. In the above example in which four bits are used to convey the data rate of the primary data channel, six of the ten bits are available for use in identifying the data rate of the enhanced data channel. These six bits can serve to identify which data rate is selected from among 64 ($2^6$) possible rates.

The process of allocating a portion of the ten TFCI bits to one data channel and the remainder of the TFCI bits to another data channel is adequate if only ten bits are needed to transmit the data rate information for both of the data channels. If more than ten bits are needed, however, this method is not adequate. Additional bits must somehow be made available to transmit the data rate information.

At first glance, it may appear to be possible to simply allocate more than two bits in the slot format to the data rate (TFCI) information. For instance, it may appear that one of the bits allocated to pilot data (410) or one of the bits allocated to power control data (420) could simply be allocated to the data rate information (430). This could be problematic, however, because reducing the number of bits allocated to pilot data (410) or power control data (420) may degrade the performance of the system.

The numbers of bits that are conventionally used for pilot data and power control data have been determined through experimentation and theoretical study. Channel estimation (which is performed using pilot data 410) and power control (which is performed using the power control data 420) are performed at every slot, rather than every frame. It is therefore necessary to provide sufficient data in every slot to enable proper channel estimation and power control. It has been determined through experimentation and theoretical study that for typical conditions, six bits are necessary for the pilot data and two bits are necessary for the power control data. If only five bits of pilot data are provided in each slot, channel estimation performance for the system is degraded. Likewise, if only one bit of power control data is provided in each slot, power control performance in the system is degraded.

In the present embodiment, it is assumed that three bits of each slot are needed to convey the data rate information for the dedicated data channels. This corresponds to a total of 45 encoded bits of data rate information (and 15 bits of raw data rate information if a ⅓ encoding is used.) It is also assumed that system performance would be degraded by either transmitting only five bits of pilot data in every slot or transmitting only one bit of power control data in every slot. The present system therefore changes the slot format periodically to alternately reduce either the number of pilot data bits or the number of power control data bits so that three TFCI bits can be included in each slot.

Figure 6:
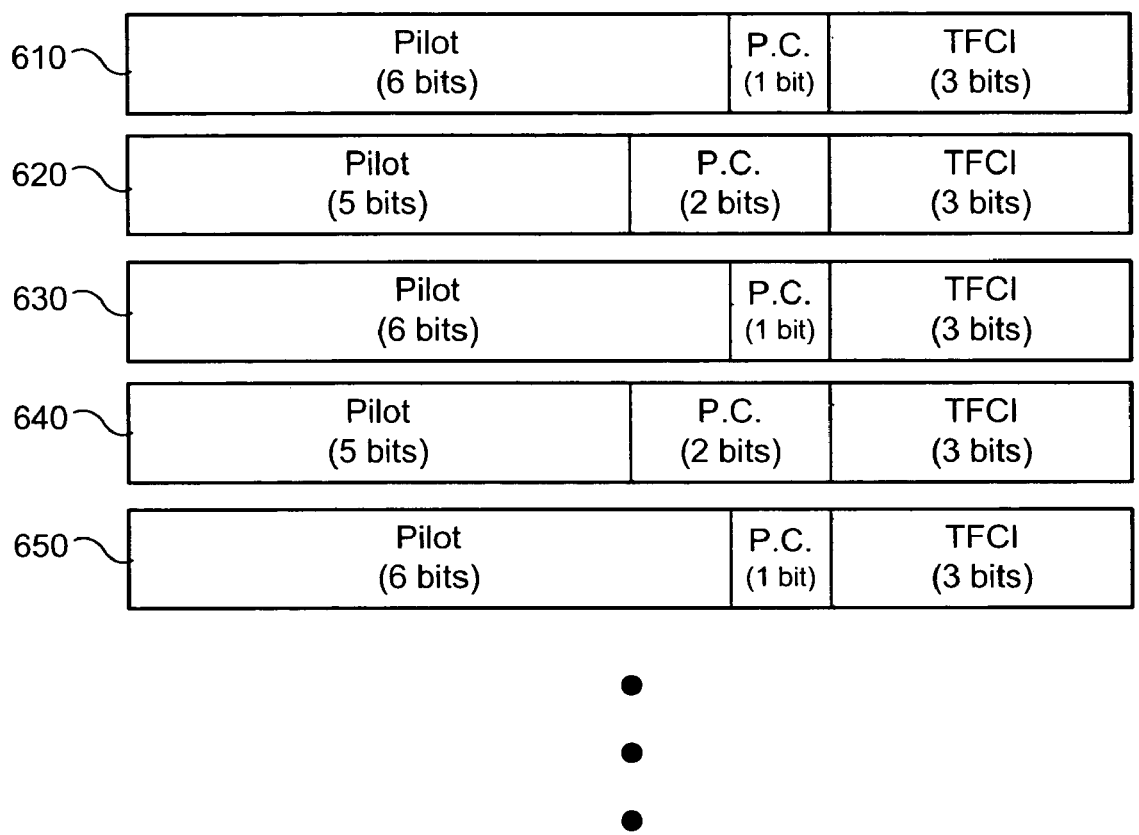
FIG. 6 is a diagram illustrating multiple slots of a control frame which use two different slot formats in accordance with one embodiment.

One embodiment of this alternating slot format is illustrated in FIG. 6. As shown in the figure, a first slot 610 includes six bits of pilot data, one bit of power control data and three bits of TFCI data. A second slot 620 includes five bits of pilot data, two bits of power control data and three bits of TFCI data. A third slot 630 is identical to slot 610 and includes six bits of pilot data, one bit of power control data and three bits of TFCI data. Thus, slot 630 therefore begins repeating the pattern of slots 610 and 620. This pattern is continued through slots 640-650 and the remainder of the slots in the frame.

Thus, in this embodiment, six bits of pilot data are transmitted in one slot, then five bits of pilot data are transmitted in the next slot, then six bits are transmitted in the next slot, and so on. While the channel estimation performance of the system corresponding to the slots in which only five data bits of pilot data are transmitted is degraded from the normal performance (using six bits of pilot data,) this degraded performance is experienced in only every other slot. It has been determined that, when these periods of degraded performance are interleaved with the periods of normal performance (corresponding to the slots in which six bits of pilot data are transmitted,) the overall channel estimation performance is only slightly degraded and in fact meets acceptable levels of performance. Similarly, although transmission of only a single power control bit in every slot would not provide adequate power control performance, alternating between one and two power control bits in successive slots does not appear to substantially degrade the power control.

Because each frame includes fifteen slots, the two-slot pattern of FIG. 6 cannot be repeated an integer number of times. As a result, the number of slots identical to slot 610 will not be the same as the number of slots identical to slot 620. In one embodiment, the slots of each frame are identical. That is, the number of slots identical to slot 610 and the number of slots identical to slot 620 will be the same in each frame. In an alternative embodiment, succeeding frames may not be identical, but may instead continue the repeating pattern of slots 610 and 620. Thus, one frame would have eight slots identical to slot 610 and seven slots identical to slot 620, while the next frame would have seven slots identical to slot 610 and eight slots identical to slot 620.

In another embodiment, it is assumed that it is desired to transmit 40 bits of encoded data rate information, rather than 45 bits. Because 40 is not evenly divisible into the fifteen slots of the control frame, the number of bits allocated to the data rate information in each slot changes from one slot to another.

Figure 7:
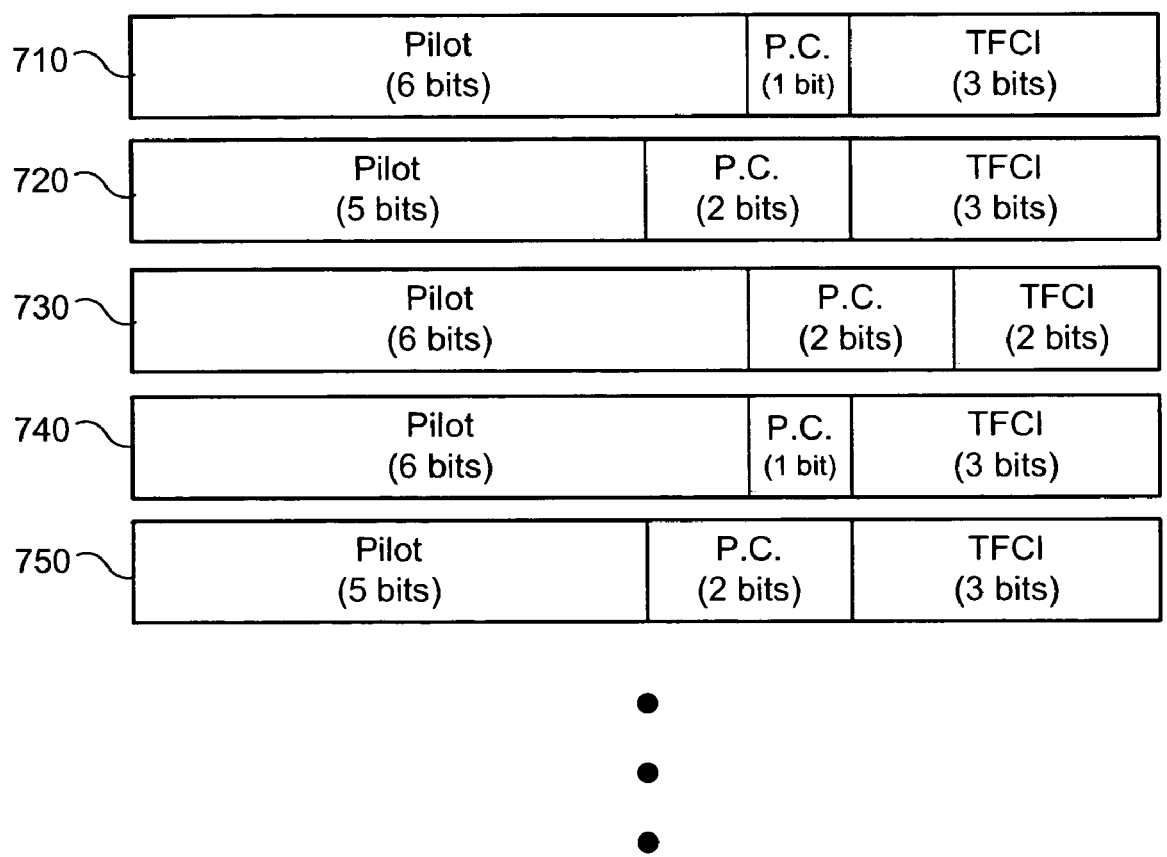
FIG. 7 is a diagram illustrating multiple slots of a control frame which use three different slot formats in accordance with an alternative embodiment.

Referring to FIG. 7, the slot formats of successive slots in this alternative embodiment is shown. A first slot 710 in this embodiment includes six bits of pilot data, one bit of power control data and three bits of TFCI data. A second slot 720 includes five bits of pilot data, two bits of power control data and three bits of TFCI data. A third slot 730 includes six bits of pilot data, two bits of power control data and two bits of TFCI data. This pattern is repeated beginning with fourth and fifth slots 740 and 750.

In the embodiment of FIG. 7, the channel estimation performance of the system is improved with respect to the slot formats of FIG. 6 because, instead of every other slot being reduced by one bit, only every third slot has a reduced number of bits. More pilot data is therefore communicated to the base station. The same is true for the power control performance of the system. The number of power control bits is reduced in every third slot instead of every second slot, so more power control data is communicated to the base station. The performance of the system is therefore improved in regard to both channel estimation and power control.

As noted above, in one embodiment, the data rate information that is transmitted in the control frames identifies the data rates for two different data channels. In this embodiment, the mobile station selects appropriate data rates for the two data channels, combines data rate indicators corresponding to these data rates, and then processes the combined data and transmits the data. The control data is transmitted using multiple slot formats. When the frame of control data is received by the base station, the information in the multiple slot formats is decoded and the data rate information corresponding to each of the primary and enhanced data channels is extracted and used in the decoding of the corresponding data channels.

Figure 8:
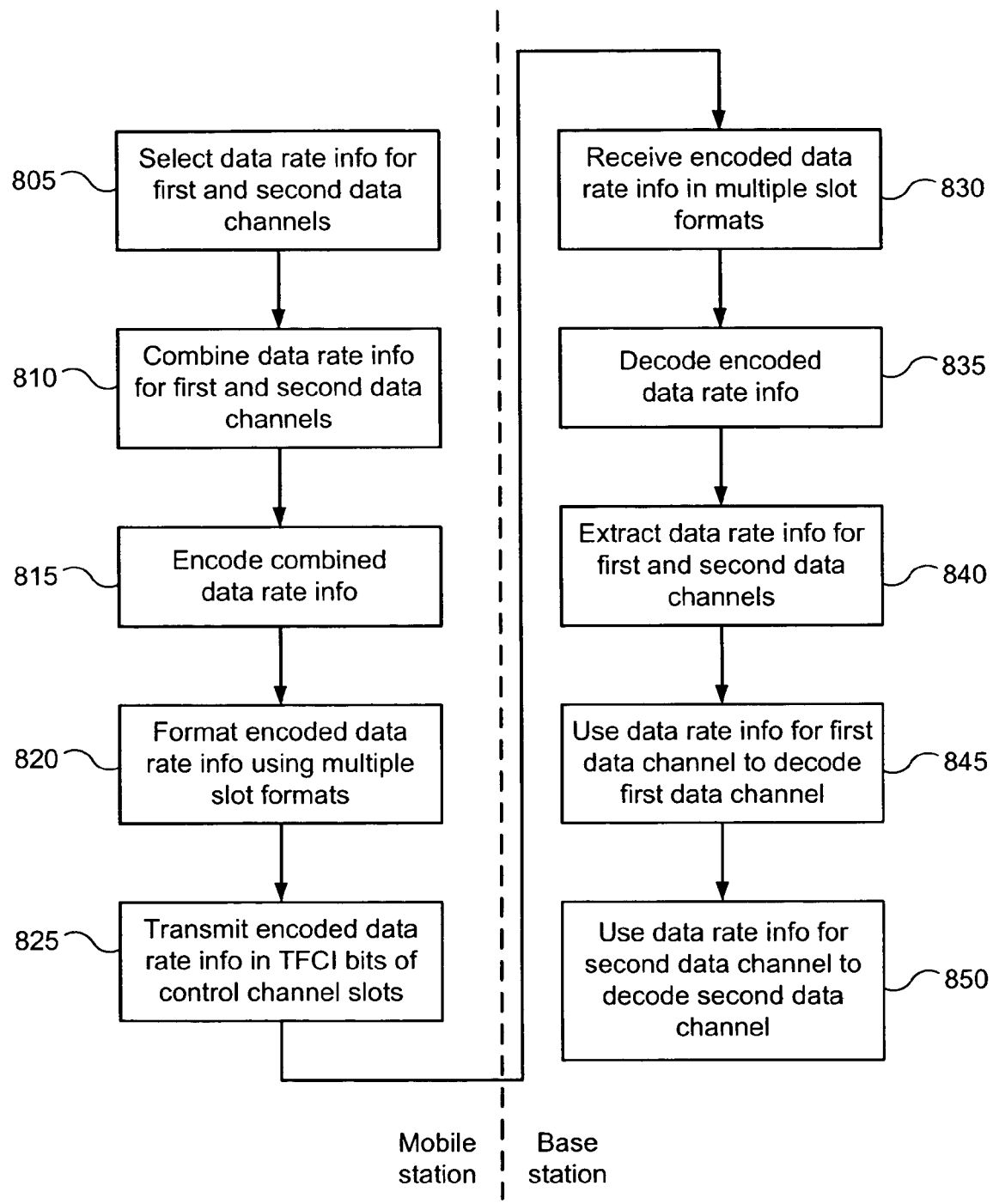
FIG. 8 is a flow diagram illustrating the process of communicating control information by transmitting the control information in slots that use at least two different slot formats in accordance with one embodiment.

The methodology employed in the present embodiment is illustrated in FIG. 8. FIG. 8 is a flow diagram illustrating the process of communicating control information for two data channels over a single control channel using multiple slot formats. The method depicted in the figure includes a first portion on the left side of the figure and a second portion on the right side of the figure. The first portion corresponds generally to the portion of the method that is performed by a mobile station. The second portion corresponds generally to the portion of the method that is performed by a base station. It should be noted that, in addition to the entire method depicted in the figure, the first and second portions of the method may, in themselves, be considered alternative embodiments.

As shown in FIG. 8, the method begins with selection of data rate information for the first and second data channels (block 805.) The data rate selection for each of the data channels may be performed in any suitable manner, such as those methods that are known in the wireless telecommunications art. When a data rate for each channel has been selected, a corresponding data rate indicator is also selected. As noted above, if a data rate is selected from among $2^n$ possible data rates, the selected rate can be represented by an n-bit value.

The data rate information (e.g., data rate indicators) for the two data channels is then combined (block 810.) In one embodiment, the two data rate indicators are combined simply by appending one to the other. Thus, if the data rate indicator for the first data channel consists of a nine-bit value and the data rate indicator for the second data channel consists of a six-bit value, the first nine of fifteen data rate bits may contain the first data rate indicator, while the last six of the data rate bits may contain the second data rate indicator. In alternative embodiments, the data rate indicators for the two data channels may be combined (multiplexed) in a different manner.

After the data rate information for the two data channels is combined, the combined information is encoded (block 815.) In one embodiment, the fifteen bits of combined data rate information are encoded in the same manner that the data rate information for the primary data channel is conventionally encoded. In the embodiment described above, the encoding consists of using a ⅓ encoding scheme and then rate matching (e.g., puncturing) the data to generate the number of bits (e.g., 45) that can be transmitted in the control frame.

The encoded data rate information is then formatted into multiple slot formats (block 820.) In one embodiment, each slot contains three bits of data rate information and varying numbers of pilot and power control data. The variably formatted data is then transmitted in a frame on the control channel (block 825,) with the first three bits of the encoded data rate information being transmitted in slot 0, the next three bits transmitted in slot 1, and so on.

After the frame of control data is transmitted by the mobile station, it is communicated to and received by the base station via the dedicated control channel (block 830.) Although the slot format of the control information varies from one slot to another, the slot formats that are used are known to the base station, either because this information is predetermined or because the information is communicated through higher layer signaling. The received frame of control information is then decoded (block 835.) In one embodiment, the decoding of the control information is performed in the same manner as if only control data for one data channel were included. In other embodiments, the decoding of the control information may be performed in other ways.

When the control data has been decoded, the fifteen bits of control information are available to the base station. The base station therefore extracts the data rate information for each of the first and second data channels (block 840.) If the mobile station combined to the data rate indicators by simply appending one to the other, the base station extracts the indicators by parsing the bits into the respective data rate indicators for the first and second data channels. If the mobile station multiplexed the data rate indicators in a more complex manner, a corresponding demultiplexing method is used by the base station to extract the indicators.

After the data rate indicators for the first and second data channels have been extracted from the control information, the base station uses these data rate indicators to determine the data rates at which the first and second data channels are transmitted and then the codes the first data channel and the second data channel using the respective data rate information (blocks 845, 850.)

It should be noted that the embodiments described above involve the transmission of combined control data because a single data channel typically does not require more than the ten bits that can be communicated using the conventional slot format illustrated in FIG. 4. In some embodiments, however, more than ten bits of TFCI information may need to be communicated for a single channel, in which case the multiple slot formats described may be used. It should be noted that multiple slot formats may also be useful in some embodiments for reasons other than the communication of additional data rate information. Other variations on the foregoing embodiments are also possible.

Although not discussed in detail above, it should be noted that the functionality described above may be implemented in the mobile stations and base stations described above by providing suitable programs that are executed in the respective processing subsystems of these devices. These program instructions are typically embodied in a storage medium that is readable by the respective processing subsystems. Exemplary storage media may include RAM memory, flash memory, ROM memory, EPROM memory, EEPROM memory, registers, hard disk, a removable disk, a CD-ROM, or any other form of storage media known in the art. Such a storage medium embodying program instructions for implementing the functionality described above comprises an alternative embodiment of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and method steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. It should also be noted that the illustrative components, blocks, modules, circuits, and steps may be reordered or otherwise reconfigured in alternative embodiments. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method implemented in a mobile station of a wireless communication system, the method comprising:
   providing at least two different slot formats for a plurality of slots in a control frame in a dedicated control channel, wherein the at least two different slot formats employ different number of bits to retain control data;
   formatting the control data according to the at least two different slot formats; and
   transmitting the control data in the at least two different slot formats.

2. The method of claim 1, wherein the slot formats of the plurality of slots in the control frame form a repeating pattern.

3. The method of claim 1, wherein an identical set of slot formats is used in every control frame.

4. The method of claim 1, wherein a first one of the at least two different slot formats includes a different number of pilot data bits than a second one of the at least two different slot formats.

5. The method of claim 1, wherein a first one of the at least two different slot formats includes a different number of power control data bits than a second one of the at least two different slot formats.

6. The method of claim 1, wherein a first one of the at least two different slot formats includes a different number of TFCI data bits than a second one of the at least two different slot formats.

7. A method implemented in a base station of a wireless communication system, the method comprising:
   receiving frames of control information via a dedicated control channel;
   extracting control data from the frames of the control information according to at least two different slot formats, wherein the at least two different slot formats employ different number of bits to retain control data for a plurality of slots in a control frame;
   decoding the extracted control data; and
   decoding data received via one or more data channels using the decoded control data.

8. The method of claim 7, wherein the slot formats of the plurality of slots in the control frame form a repeating pattern.

9. The method of claim 7, wherein an identical set of slot formats is used in every frame of control information.

10. The method of claim 7, wherein a first one of the at least two different slot formats includes a different number of pilot data bits than a second one of the at least two different slot formats.

11. The method of claim 7, wherein a first one of the at least two different slot formats includes a different number of power control data bits than a second one of the at least two different slot formats.

12. The method of claim 7, wherein a first one of the at least two different slot formats includes a different number of TFCI data bits than a second one of the at least two different slot formats.

13. A method implemented in a wireless communication system, the method comprising:
  providing at least two different slot formats, a first slot format and a disparate slot format, employing different number of bits to retain control data;
  formatting control data for a plurality of slots in a control frame according to the at least two different slot formats; and
  transmitting the formatted control data for the plurality of slots in the control frame in the at least two different slot formats from a mobile station to a base station via a control channel;
  receiving the control frame;
  extracting the control data from the control frame according to the at least two different slot formats;
  decoding the extracted control data; and
  decoding data received via one or more data channels using the decoded control data.

14. The method of claim 13, wherein the slot formats of the plurality of slots in the control frame form a repeating pattern.

15. The method of claim 13, wherein an identical set of slot formats is used in every control frame.

16. The method of claim 13, wherein a first one of the at least two different slot formats includes a different number of pilot data bits than a second one of the at least two different slot formats.

17. The method of claim 13, wherein a first one of the at least two different slot formats includes a different number of power control data bits than a second one of the at least two different slot formats.

18. The method of claim 13, wherein a first one of the at least two different slot formats includes a different number of TFCI data bits than a second one of the at least two different slot formats.

19. A mobile station for a wireless communication system comprising:
  a transceiver subsystem; and
  a processing subsystem coupled to the transceiver subsystem and configured to:
    provide at least two different slot formats, wherein the at least two different slot formats employ different number of bits to retain control data for a plurality of slots in a control frame;
    format the control data according to the at least two different slot formats; and
  wherein the transceiver subsystem is configured to transmit the control data in the at least two different slot formats in a control frame via a dedicated control channel.

20. The mobile station of claim 19, wherein the slots formats of the plurality of slots in the control frame form a repeating pattern.

21. The mobile station of claim 19, wherein an identical set of slot formats is used in every control frame.

22. The mobile station of claim 19, wherein a first one of the at least two different slot formats includes a different number of pilot data bits than a second one of the at least two different slot formats.

23. The mobile station of claim 19, wherein a first one of the at least two different slot formats includes a different number of power control data bits than a second one of the at least two different slot formats.

24. The mobile station of claim 19, wherein a first one of the at least two different slot formats includes a different number of TFCI data bits than a second one of the at least two different slot formats.

25. A base station for a wireless communication system comprising:
  a transceiver subsystem configured to receive frames of control information via a dedicated control channel; and
  a processing subsystem coupled to the transceiver subsystem and configured to extract control data from the frames of the control information according to at least two different slot formats for a plurality of slots, decode the extracted control data, and decode data received via one or more data channels using the decoded control data, wherein the at least two slot employ different formats employ different number of bits to retain the control data.

26. The base station of claim 25, wherein the slot formats of the plurality of slots in the control frame from a repeating pattern.

27. The base station of claim 25, wherein an identical set of slot formats is used in every frame of control information.

28. The base station of claim 25, wherein a first one of the at least two different slot formats includes a different number of pilot data bits than a second one of the at least two different slot formats.

29. The base station of claim 25, wherein a first one of the at least two different slot formats includes a different number of power control data bits than a second one of the at least two different slot formats.

30. The base station of claim 25, wherein a first one of the at least two different slot formats includes a different number of TFCI data bits than a second one of the at least two different slot formats.

31. A wireless communication system comprising:
  a mobile station configured to:
    provide at least two different slot formats, wherein the at least two slot formats employ different number of bits to retain control data,
    format the control data for a plurality of slots in a control frame according to the at least two different slot formats, and
    transmit the control data for the plurality of slots in the control frame in the at least two different slot formats, and
  a base station configured to:
    receive the control frame via a dedicated control channel, extract the control data from the control frame according to the at least two different slot formats,
    decode the extracted control data, and
    decode data received via one or more data channels using the decoded control data.

32. The wireless communication system of claim 31, wherein the slot formats of the plurality of slots in the control frame form a repeating pattern.

33. The wireless communication system of claim 31, wherein an identical set of slot formats is used in every control frame.

34. The wireless communication system of claim 31, wherein a first one of the at least two different slot formats includes a different number of pilot data bits than a second one of the at least two different slot formats.

35. The wireless communication system of claim 31, wherein a first one of the at least two different slot formats includes a different number of power control data bits than a second one of the at least two different slot formats.

36. The wireless communication system of claim 31, wherein a first one of the at least two different slot formats includes a different number of TFCI data bits than a second one of the at least two different slot formats.

37. A mobile station for a wireless communication system comprising:
    transceiver means; and
    processing means coupled to the transceiver means and configured to:
        provide at least two different slot formats for a plurality of slots, wherein the at least two different slot formats employ different number of bits to retain control data for a plurality of slots in a control frame;
        format the control data according to the at least two different slot formats; and
    wherein the transceiver means is configured to transmit the control data in the at least two different slot formats in the control frame via a dedicated control channel.

38. The mobile station of claim 37, wherein the slot formats of the plurality of slots in the control frame form a repeating pattern.

39. The mobile station of claim 37, wherein an identical set of slot formats is used in every control frame.

40. The mobile station of claim 37, wherein a first one of the at least two different slot formats includes a different number of pilot data bits than a second one of the at least two different slot formats.

41. The mobile station of claim 37, wherein a first one of the at least two different slot formats includes a different number of power control data bits than a second one of the at least two different slot formats.

42. The mobile station of claim 37, wherein a first one of the at least two different slot formats includes a different number of TFCI data bits than a second one of the at least two different slot formats.

43. A base station for a wireless communication system comprising:
    transceiver means configured to receive frames of control information via a dedicated control channel; and
    processing means coupled to the transceiver means and configured to extract control data from the frames of the control information in the dedicated control channel according to at least two different slot formats for a plurality of slots, decode the extracted control data, and decode data received via one or more data channels using the decoded control data, and wherein the at least two different slot formats employ different number of bits to retain the control data, wherein the at least two different slot formats form a repeating pattern.

44. The base station of claim 43, wherein an identical set of slot formats is used in every frame of control information.

45. The base station of claim 43, wherein a first one of the at least two different slot formats includes a different number of pilot data bits than a second one of the at least two different slot formats.

46. The base station of claim 43, wherein a first one of the at least two different slot formats includes a different number of power control data bits than a second one of the at least two different slot formats.

47. The base station of claim 43, wherein a first one of the at least two different slot formats includes a different number of TFCI data bits than a second one of the at least two different slot formats.

48. A computer-readable medium having a computer program, which when executed by at least one processor, operates to transmit control data, the computer program comprising:
    instructions for providing at least two different slot formats for a plurality of slots in a control frame in a dedicated control channel, wherein the at least two different slot formats employ different number of bits to retain control data;
    instructions for formatting the control data according to the at least two different slot formats; and
    instructions for transmitting the control data in the at least two different slot formats.

49. At least one processor configured to perform a method of transmitting control data, the method comprising:
    providing at least two different slot formats for a plurality of slots in a control frame in a dedicated control channel, wherein the at least two different slot formats employ different number of bits to retain control data;
    formatting the control data according to the at least two different slot formats; and
    transmitting the control data in the at least two different slot formats.

* * * * *